US011916649B2

(12) United States Patent
Pasquet et al.

(10) Patent No.: US 11,916,649 B2
(45) Date of Patent: Feb. 27, 2024

(54) SATELLITE-COMMUNICATION MODULE FOR A MOTOR VEHICLE (71) Applicant: Continental Automotive Technologies GmbH, Hannover (DE)

(72) Inventors: Emmanuel Pasquet, Toulouse (FR); Mohamed Cheikh, Toulouse (FR); Sébastien Kessler, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/034,795

(22) PCT Filed: Sep. 30, 2021

(86) PCT No.: PCT/EP2021/076931
§ 371 (c)(1),
(2) Date: May 1, 2023

(87) PCT Pub. No.: WO2022/096201
PCT Pub. Date: May 12, 2022

(65) Prior Publication Data
US 2023/0396321 A1 Dec. 7, 2023

(30) Foreign Application Priority Data
Nov. 3, 2020 (FR) ........................ 2011252

(51) Int. Cl.
*H04B 1/04* (2006.01)
*H04B 7/06* (2006.01)
(Continued)

(52) U.S. Cl.
CPC ..... *H04B 7/18508* (2013.01); *H04B 7/18519* (2013.01); *H04B 7/195* (2013.01)

(58) Field of Classification Search
CPC . H04B 7/18508; H04B 7/18519; H04B 7/195
(Continued)

(56) References Cited

U.S. PATENT DOCUMENTS

| 10,320,471 B1* | 6/2019 | Panthi | H04B 7/18513 |
| 2006/0035588 A1* | 2/2006 | Chapelle | H04B 7/18508 |
| | | | 455/13.3 |

(Continued)

FOREIGN PATENT DOCUMENTS

| WO | 9922422 A1 | 5/1999 |
| WO | 2006057000 A1 | 6/2006 |
| WO | 2016092369 A1 | 6/2016 |

OTHER PUBLICATIONS

Khanlari, A. et al., "A New Efficient Algorithm for Tracking LEO Satellites", dated Apr. 15, 2013, IEEE, 4 pages.
International Search Report and Written Opinion for International Application No. PCT/EP2021/076931, dated Dec. 21, 2021, 8 pages.

(Continued)

*Primary Examiner* — Tanmay K Shah
(74) *Attorney, Agent, or Firm* — Buchanan Ingersoll & Rooney PC (57) ABSTRACT

A satellite communication module for a vehicle. The module includes an electronic control unit and at least one antenna capable of communicating with a plurality of satellites that are characterized by a predefined orbital trajectory and the same predefined speed. The at least one antenna being configurable according to a plurality of configurations, each configuration allowing the at least one antenna to radiate in an angular window, each angular window corresponding to an area of the sky that is characterized by a longitudinal coordinate and a transverse coordinate. The control unit includes a memory area. The memory area including a calibration table of the at least one antenna. The control circuit being configured to adapt the radiation of the at least one antenna so that the antenna radiates in the direction of (Continued)

the at least one determined angular window during the corresponding given time interval.

10 Claims, 7 Drawing Sheets

(51) Int. Cl.
    *H04B 7/185*     (2006.01)
    *H04B 7/195*     (2006.01)

(58) Field of Classification Search
    USPC ............................................ 375/262
    See application file for complete search history.

(56) References Cited

U.S. PATENT DOCUMENTS

| | | | |
|---|---|---|---|
| 2018/0145744 A1* | 5/2018 | Petranovich | H04B 7/18515 |
| 2018/0254824 A1* | 9/2018 | Speidel | H04B 7/18515 |
| 2022/0052753 A1* | 2/2022 | Speidel | H04W 16/10 |

OTHER PUBLICATIONS

International Search Report and Written Opinion for International Application No. PCT/EP2021/076931, dated Dec. 21, 2021, 13 pages (French).
French Search Report for French Application No. 2011252, dated Aug. 2, 2021 with translation, 11 pages.
English Translation of the Written Opinion for International Application No. PCT/EP2021/076931, dated Dec. 21, 2021, 5 pages.

* cited by examiner

|  | $Y_1$ | $Y_2$ | $Y_3$ | $Y_4$ | $Y_5$ | $Y_6$ | $Y_7$ | $Y_8$ | $Y_9$ |
|---|---|---|---|---|---|---|---|---|---|
| $X_1$ | | | | | | | | | |
| $X_2$ | | | | | | | | | |
| $X_3$ | | | | | | | | | |
| $X_4$ | | | | | | | | | |
| $X_5$ | | | | | | | | | |
| $X_6$ | | | | | | | | | |
| $X_7$ | | | | | | | | | |
| $X_8$ | | | | | | | | | |
| $X_9$ | | | | | | | | | |

SATELLITE-COMMUNICATION MODULE FOR A MOTOR VEHICLE

CROSS REFERENCE TO RELATED APPLICATIONS

This application is the U.S. National Phase Application of PCT International Application No. PCT/EP2021/076931, filed Sep. 30, 2021, which claims priority to French Patent Application No. 2011252, filed Nov. 3, 2020, the contents of such applications being incorporated by reference herein.

FIELD OF THE INVENTION

The invention relates to the field of vehicles, in particular automobiles, and more specifically to a communication module for a vehicle allowing said vehicle to communicate with satellites. The invention aims in particular to allow optimized communication between the vehicle and one or more satellites.

BACKGROUND OF THE INVENTION

As is known, some vehicles are referred to as "connected" and are able to communicate with at least one satellite. In the present case, these are in particular LEO (Low Earth Orbit) satellites, in other words satellites defined in low Earth orbit, at an altitude of between 500 km and 1200 km. Each satellite moves in its orbit at a speed of 27 000 km/h and is therefore visible to each connected vehicle for only about ten minutes.

To communicate with the satellites, each connected vehicle comprises in particular one antenna, or a network of antennas, through which signals, in particular radiofrequency signals, pass. For example, each connected vehicle is equipped with a directional antenna, in other words an antenna that radiates in a predefined direction.

However, since a directional antenna radiates in one direction only, it is therefore sensitive to movement, and therefore, here, to the movement of the satellite relative to the vehicle. Because of this, the quality of the communication between the antenna and the satellite may not be reliable, in other words it may not be continuous and may suffer interruptions.

In addition, a directional antenna is also sensitive to the environment, in particular because of the multipath phenomenon. The multipath phenomenon occurs when a radiofrequency signal propagates from a first point to a second point via multiple paths, in particular because the signal is reflected by obstacles, such as buildings or vehicles. This phenomenon can therefore cause the attenuation or loss of radiofrequency signals.

To rectify this, and to have a reliable communication link between the antenna and the satellite, it is possible to use a greater number of satellites. However, this solution has a high cost and increases the number of possible interferences between the satellites, since the satellites are in large numbers and are close to each other in their orbit.

In another solution, the vehicle comprises a dynamic tracking system comprising a motorized antenna. The dynamic tracking system controls the motorized antenna to vary the direction of radiation of the antenna on the basis of the position of the satellite. More precisely, the dynamic system detects the position of a satellite, in particular using the "scanning" method, and then controls the movement of the motorized antenna so that said antenna is oriented towards the satellite on the basis of the movement of the satellite. However, detecting the position of the satellite is time-consuming and uses a lot of energy.

Therefore, there is a need for a solution that can be used to overcome these drawbacks at least in part.

SUMMARY OF THE INVENTION

An aspect of the invention relates to a satellite communication module for a vehicle, in particular an automobile, said communication module comprising an electronic control unit and at least one antenna capable of communicating with a plurality of satellites that are characterized by a predefined orbital trajectory and the same predefined speed:
 a. the at least one antenna being configurable according to a plurality of configurations, each configuration allowing the at least one antenna to radiate in an angular window among a plurality of predefined angular windows, each angular window corresponding to an area of the sky that is characterized by a longitudinal coordinate and a transverse coordinate,
 b. the control unit comprising a memory area, said memory area comprising a calibration table of the at least one antenna, representing a map of the sky seen from the vehicle and comprising a plurality of columns and a plurality of rows, each row being identifiable by a longitudinal coordinate, each column being identifiable by a transverse coordinate, the intersection of each row and each column being a cell in the calibration table, denoting an angular window, the control circuit being configured to:
  i. obtain a set of parameters comprising the position, the orbital trajectory and the speed of a satellite and the position, the inclination and/or the orientation, and the speed of the vehicle,
  ii. determine the portion of the trajectory of the satellite that is seen from the vehicle from the set of parameters that is obtained,
  iii. determine, from the calibration table, at least one angular window corresponding to the position of the satellite on the determined portion of the trajectory of the satellite in a given time interval,
  iv. adapt the radiation of the at least one antenna so that said antenna radiates in the direction of the at least one determined angular window during the corresponding given time interval.

In particular, the at least one satellite moves at constant speed in a defined orbit at constant altitude.

When the communication module determines the trajectory portion of the visible satellite, it estimates the trajectory portion of the satellite from the parameters received. Thus, the communication module is able to quickly and simply determine the position of the satellite on the basis of time, from the portion of the estimated trajectory, and no longer by directly detecting the position of the satellite. Moreover, by quickly knowing the position of the satellite on the trajectory portion, the configuration module is able to adapt the at least one antenna to radiate in the direction of the position of the satellite. Thus, the communication module can be used to ensure a reliable communication channel between the communication module and the satellite.

Moreover, since the satellite moves and passes from one angular window to another, the control unit is able to know the instant from which the configuration of the at least one antenna needs to be modified in order to correspond to the new angular window in which the satellite is located. This ensures a reliable and continuous communication channel between the vehicle and the satellite.

When a first satellite is no longer visible, the control unit is configured to configure the at least one antenna so that said antenna radiates in the angular window in which a second satellite is located. This ensures a reliable and continuous communication channel between the vehicle and a plurality of satellites.

Preferably, the control unit is configured to:
a. determine the radiofrequency propagation environment of the vehicle, defining the quality of propagation of the radiofrequency signals in the environment close to the vehicle, in order to identify whether the vehicle is located in a crowded area,
b. determine the calibration table of the at least one antenna, the number of angular windows and the dimension of each angular window being defined on the basis of the propagation environment of the vehicle, the more the environment of the vehicle is crowded, the more the number of angular windows decreases, and the more the dimension of each angular window increases.

The control unit itself can thus be used to determine the calibration table on the basis of the crowding level of the environment close to the vehicle.

Advantageously, the control unit is configured to determine the initial position of the satellite, on the basis of the longitudinal coordinates and the transverse coordinates in the calibration table, from the position of the satellite that is obtained and from the position, speed, orientation and/or inclination of the vehicle that are obtained, in order to determine the portion of the trajectory of the satellite that is seen by the vehicle.

The initial position thus determined is an additional parameter allowing the control unit to determine the portion of the trajectory of the satellite.

Preferably, each angular window in the calibration table is associated with a set of configuration instructions, and the set of configuration instructions for a given angular window that is applied to the at least one antenna allows the at least one antenna to radiate in said given angular window, the control unit being configured to adapt the at least one antenna so that said antenna radiates in the direction of a determined angular window by transmitting the set of configuration instructions that is associated with said determined angular window to the at least one antenna.

Thus, the control unit can easily adapt the operation of the at least one antenna on the basis of the position of the satellite, simply by sending a set of configuration instructions to the at least one antenna.

Preferably, each longitudinal coordinate in the calibration table is associated with a predetermined time interval, and the control unit is configured to adapt the position of the at least one antenna by sending the set of configuration instructions that is associated with the angular window in which the satellite is located at a given instant over the time interval associated with the longitudinal coordinate of said angular window.

The time interval allows the control unit to know when to send the set of configuration instructions on the basis of the angular window in which the satellite is located.

More preferably, the control unit is configured to periodically receive the inclination and the orientation of the vehicle, and, for each inclination and/or orientation of the vehicle that is obtained, the control unit is configured to transform, by applying translations and rotations, the portion of the orbital trajectory of the satellite that is seen from the vehicle on the basis of the orientation and inclination of said vehicle that are obtained.

An aspect of the invention also relates to a vehicle comprising a satellite communication module as presented above.

An aspect of the invention also relates to a satellite communication method for a vehicle, said vehicle comprising a communication module as presented above, said method comprising the steps of:
i. obtaining a set of parameters comprising the position, the orbital trajectory and the speed of the satellite and the position, the direction/orientation and the speed of the vehicle,
ii. determine the portion of the trajectory of the satellite that is seen from the vehicle from the set of parameters that is obtained,
iii. determine, from the table, at least one angular window corresponding to the position of the satellite on the determined portion of the trajectory of the satellite in a given time interval,
iv. adapt the radiation of the at least one antenna so that said antenna radiates in the direction of the at least one determined angular window during the corresponding given time interval.

Preferably, the method comprises, before the step of determining the at least one angular window corresponding to the position of the satellite, the steps of:
a. determining the radiofrequency propagation environment of the vehicle, defining the quality of propagation of the radiofrequency signals in the environment close to the vehicle, in order to identify whether the vehicle is located in a crowded area,
b. determining the calibration table of the at least one antenna, the number of angular windows and the dimension of each angular window being defined on the basis of the propagation environment of the vehicle, the more the environment of the vehicle is crowded, the more the number of angular windows decreases, and the more the dimension of each angular window increases.

More preferably, the method comprises, before the step of determining the portion of the trajectory of the satellite, a step of determining the initial position of the satellite from the position of the satellite that is obtained and from the position, speed, orientation and/or inclination of the vehicle that are obtained.

An aspect of the invention also relates to a computer program product that is noteworthy in that it contains a set of program code instructions that, when they are executed by one or more processors, configure the one or more processors to implement a method as presented above.

BRIEF DESCRIPTION OF THE DRAWINGS

Other features and advantages of aspects of the invention will become more apparent upon reading the description that follows. This description is purely illustrative and should be read with reference to the appended drawings, in which.

DETAILED DESCRIPTION OF THE PREFERRED EMBODIMENTS

There now follows a presentation of an embodiment of a communication module for a vehicle, in particular an automobile, allowing said vehicle to communicate with at least one satellite.

Satellite

The at least one satellite is in particular a LEO (Low Earth Orbit) satellite, in other words a satellite defined in low Earth orbit. In particular, an LEO satellite moves at a constant speed, for example 27 000 km/h, in a defined orbit at a constant altitude, for example between 500 km and 1200 km, relative to Earth's surface.

In other words, each LEO satellite moves along an orbital trajectory that is specific to it, the orbital trajectory denoting the trajectory followed by said LEO satellite around planet Earth.

The satellite is in particular configured to transmit its position to the vehicles present in its coverage area, denoting the terrestrial surface seen by the satellite at a given instant.

Vehicle

Figure 1:
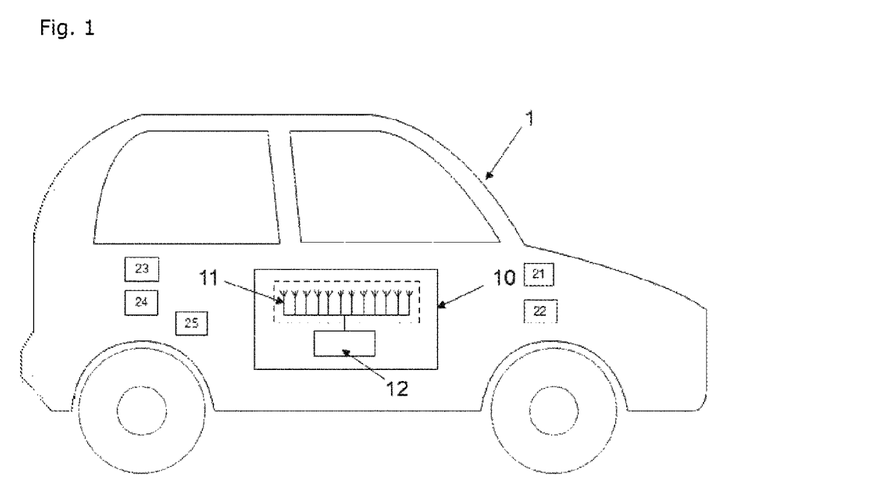
FIG. 1 illustrates one embodiment of the vehicle according to the invention.

Referring to FIG. 1, the vehicle 1 according to an aspect of the invention comprises in particular a communication module 10 in order to communicate with the at least one LEO satellite. The vehicle 1 comprises in particular a locator device 21, an environment sensor 22, a speed sensor 23, at least one inclination sensor 24 of the vehicle 1, and at least one orientation sensor 25 of the vehicle 1.

Communication Module

Still referring to FIG. 1, the communication module 10 comprises at least one antenna 11 and an electronic control unit 12.

Antenna 11

The at least one antenna 11 is directional and therefore able to radiate in a particular direction in order to communicate with the at least one satellite. Moreover, the at least one antenna 11 is configurable according to a plurality of configurations. Each configuration allows the antenna 11 to radiate in an angular window among a plurality of predefined angular windows. In other words, each configuration allows the at least one antenna 11 to radiate in the direction of a predefined angular window. Each angular window corresponds to an area of the sky that is visible to the vehicle 1 and therefore to the at least one antenna 11, each angular window being characterized by a longitudinal coordinate and a transverse coordinate.

Figure 2:
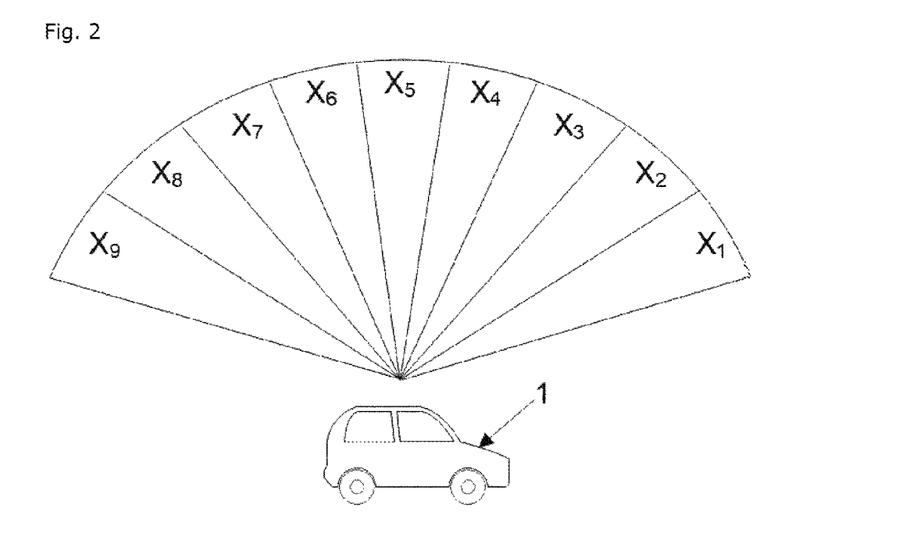
FIG. 2 illustrates an example of the set of longitudinal coordinates of the angular windows visible to the vehicle according to an aspect of the invention.

Referring to FIG. 2, an example of a set of longitudinal coordinates $X_i$ is shown, i denoting a natural number, each longitudinal coordinate $X_i$ being defined in the vertical longitudinal plane of the vehicle 1. "Vertical longitudinal plane of the vehicle 1" is understood to mean the plane comprising the longitudinal axis, along which the vehicle 1 extends and which is parallel to the terrestrial vertical. In particular, each longitudinal coordinate $X_i$ represents an angular sector of said vertical longitudinal plane that is specific to said longitudinal coordinate $X_i$. Each angular sector is oriented from the vehicle 1 towards the sky. The angular sectors corresponding to each longitudinal coordinate $X_i$ may or may not be defined by the same angle value. The number of longitudinal coordinates $X_i$ is modifiable.

For example the set of longitudinal coordinates $X_i$ amounts to nine, in other words the subscript "i" is a natural number ranging from 1 to 9.

Figure 3:
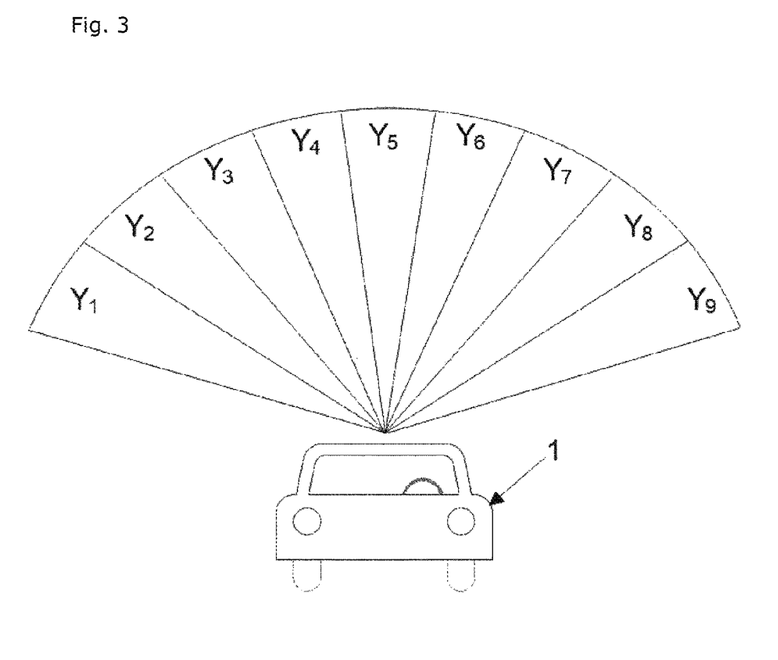
FIG. 3 illustrates an example of the set of transverse coordinates of the angular windows visible to the vehicle according to an aspect of the invention.

Similarly, referring to FIG. 3, an example of a set of transverse coordinates $Y_i$ is shown, i denoting a natural number, each transverse coordinate $Y_i$ being defined in the vertical transverse plane of the vehicle 1. "Vertical transverse plane of the vehicle 1" is understood to mean the plane comprising the transverse axis of the vehicle 1, defined as the axis perpendicular to the longitudinal axis and parallel to the ground, said plane also being parallel to the terrestrial vertical. In particular, each transverse coordinate $Y_i$ represents an angular sector of said vertical transverse plane that is specific to said transverse coordinate $Y_i$. Each angular sector is oriented from the vehicle 1 towards the sky. The angular sectors corresponding to each transverse coordinate $Y_i$ may or may not be defined by the same angle value. The number of transverse coordinates $Y_i$ is modifiable.

For example, the set of transverse coordinates amounts to nine, in other words the subscript "i" is a natural number ranging from 1 to 9.

Figure 4:
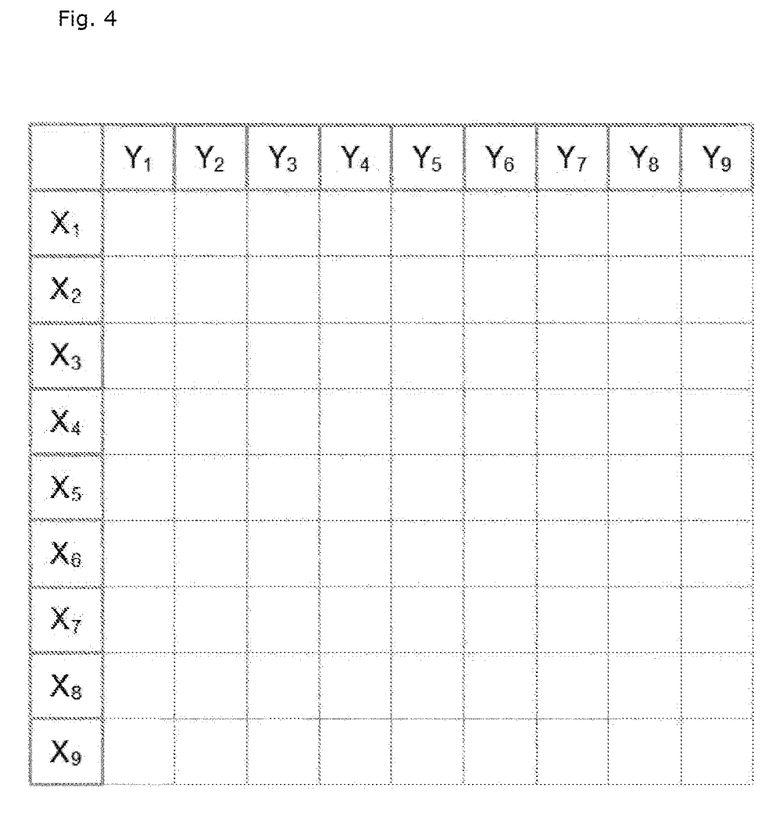
FIG. 4 shows a plan of the set of angular windows visible to the vehicle according to an aspect of the invention in two dimensions, on the basis of the longitudinal and transverse coordinates shown in FIGS. 2 and 3.

Referring to FIG. 4, an example of a two-dimensional plan of all the angular windows is shown, in other words the areas of the sky that are visible to the vehicle 1, which are defined on the basis of the longitudinal $X_i$ and transverse $Y_i$ coordinates. In other words, FIG. 4 shows a view from above, or from below, of a horizontal cross section of the set of angular windows. The horizontal cross section is in particular defined at the altitude at which the at least one LEO satellite moves on its orbital trajectory. In particular, each angular window, in other words each angular area visible from the vehicle 1, has a convex quadrilateral cross section. For example, each angular window has a substantially rectangular cross section.

According to another embodiment, each angular window has a substantially hexagonal cross section.

Each angular window is associated with a set of configuration instructions. When the set of configuration instructions associated with a given angular window is applied to the at least one antenna 11, this allows the at least one antenna 11 to radiate in the given angular window, in other words in the direction of the angular window.

Thus, the at least one antenna 11 is in particular configurable according to a configuration from a set of configuration instructions received by the at least one antenna 11. In other words, when the at least one antenna 11 receives a set of configuration instructions, the at least one antenna 11 implements the instructions received.

Figure 5:
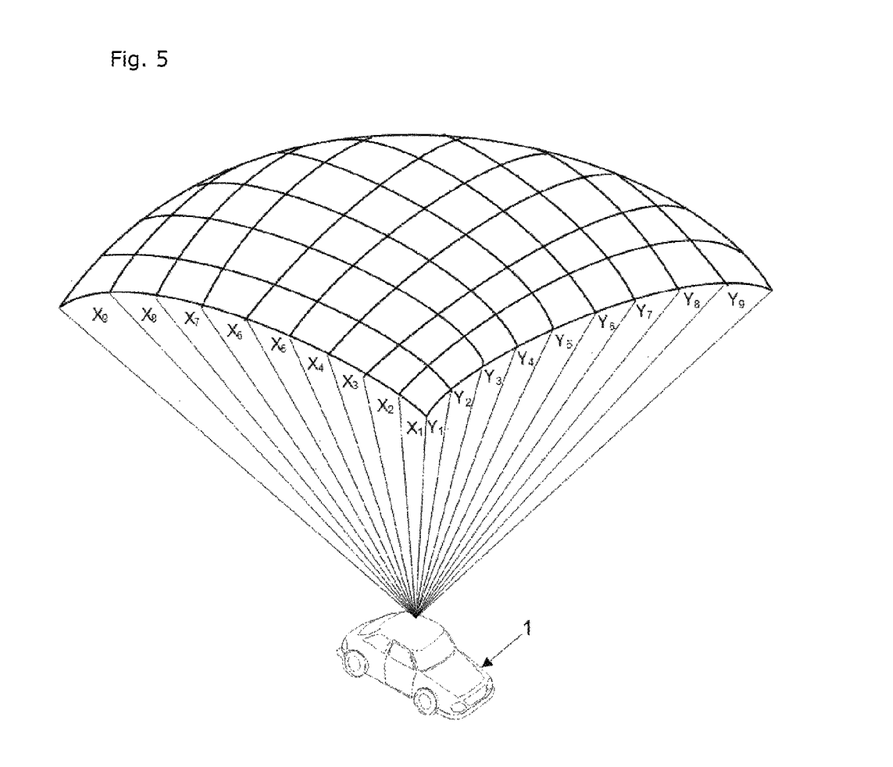
FIG. 5 shows the set of angular windows visible to the vehicle according to an aspect of the invention in three dimensions, on the basis of the longitudinal and transverse coordinates shown in FIGS. 2 and 3.

Referring to FIG. 5, all the areas of the sky that are visible to the vehicle 1, in other words the set of angular windows, are shown in three dimensions, on the basis of the longitudinal coordinates $X_i$ and the transverse coordinates $Y_i$.

According to a first embodiment of the at least one antenna 11, the communication module 10 comprises a single antenna 11.

Figure 6:
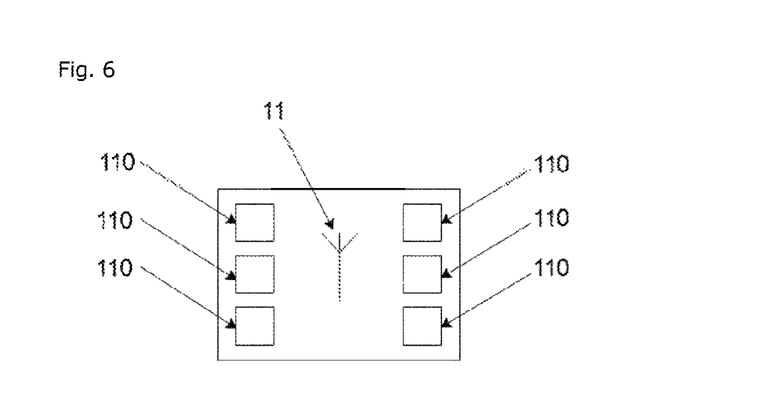
FIG. 6 shows a first embodiment of an antenna installed in a vehicle according to the invention.

For example, referring to FIG. 6, the single antenna 11 is associated with at least one passive element. Each passive element is a metamaterial 110, for example, defined as a composite material having electromagnetic properties.

When power is supplied to a metamaterial 110, it is said to be "active" and emits electromagnetic radiation. It is possible to control the supply of power to each metamaterial 110 independently. The direction of the radiation from the antenna 11 therefore results from the combination of the radiation emitted by the antenna 11 itself and the electromagnetic radiation emitted by the at least one metamaterial 110 to which power is supplied.

The influence of each metamaterial 110 on the direction of radiation of the antenna 11 is known. Thus, so that the antenna 11 radiates in a given radiation direction, it is possible to activate the at least one metamaterial 110, allowing the antenna 11 to radiate in the given direction.

In the present case, the set of configuration instructions for the antenna 11 comprises a, optionally active, combination of states, each state relating to a metamaterial 110.

According to a second embodiment of the at least one antenna 11, the communication module 10 comprises an array of antennas 11.

Figure 7:
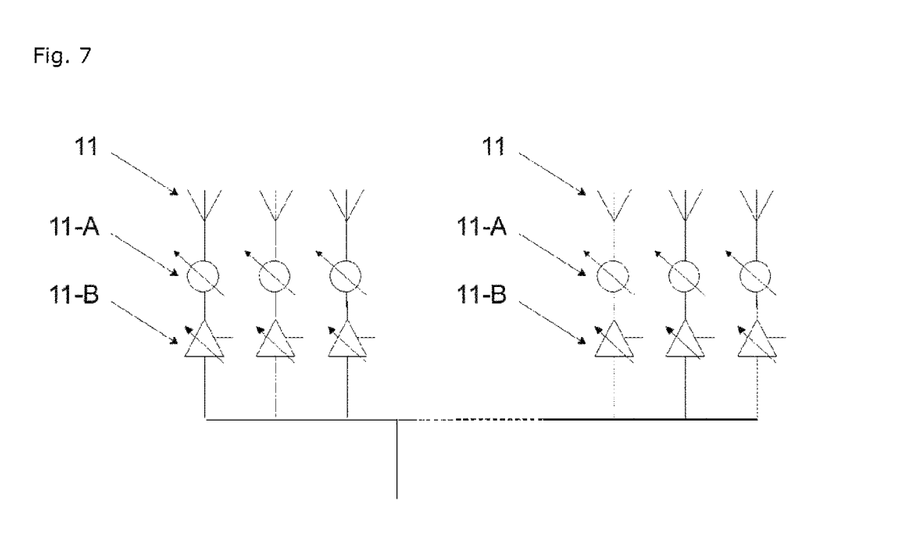
FIG. 7 shows a first example of a second embodiment of an array of antennas that is installed in a vehicle according to the invention.

Referring to FIG. 7, based on a first example, the array of antennas 11 is directional, and therefore able to radiate in a particular direction. Each antenna 11 is connected to an amplifier 11-A and a phase shifter 11-B. Each assembly comprising an antenna 11, an amplifier 11-1 and a phase shifter 11-B connected to said antenna 11 constitutes an active element.

The direction of radiation of the array of antennas 11 is defined by the combination of the radiations from each active element. Thus, by modifying the phase, using the phase shifter 11-B, and the amplitude, using the amplifier 11-A, of each active element, it is possible to modify the radiation of each antenna 11, and therefore the direction of radiation of the array of antennas 11.

In the present case, the set of configuration instructions that is associated with each angular window is defined by a set of combinations of phase and amplitude values, each combination of phase and amplitude values relating to an active element of the array of antennas 11.

Based on a second example, the array of antennas 11 comprises a plurality of antennas 11, which are independent of each other. Each antenna 11 of the array of antennas 11 radiates in an angular window, in other words in a direction of radiation, that is specific to it. Thus, in order to radiate in a given angular window, it is necessary to activate, in other words to supply power to, the antenna 11 of the plurality of antennas 11 that radiates in said angular window, and to deactivate all the other antennas 11 of the plurality of antennas 11.

The set of configuration instructions that is associated with each angular window is defined here by a, optionally active, combination of states, each state relating to an antenna 11 of the array of antennas 11.

Control Unit 12

Figure 8:
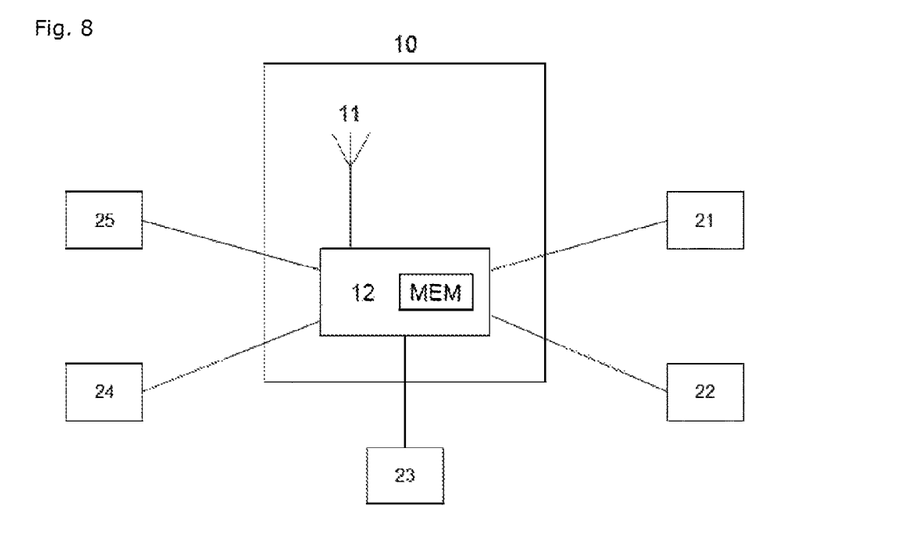
FIG. 8 illustrates a communication module installed in the vehicle and a set of devices of the vehicle that are connected to the control unit of the communication module according to an aspect of the invention.

Referring to FIG. 8, the control unit 12 is electrically connected to the at least one antenna 11. In addition, the control unit 12 is in particular connected to at least one locator device 21, to at least one environment sensor 22, to a speed sensor 23 of the vehicle 1, to at least one inclination sensor 24 of the vehicle 1, and to at least one orientation sensor 25 of the vehicle 1.

The at least one locator device 21 is configured to determine the geographical position of the vehicle 1. The at least one locator device 21 is preferably a satellite locator device, for example a GPS (Global Positioning System) system, which is known to those skilled in the art, or a GNSS (Geolocation and Navigation by a Satellite System) receiver, which is also known to those skilled in the art. The at least one locator device 21 is also configured to send the determined geographical position of the vehicle 1 to the control unit 12.

The at least one environment sensor 22 can be used to measure at least one environment parameter.

The at least one environment parameter allows the control unit 12 to define the environment close to the vehicle 1, and more particularly to define the crowding level of the environment of the vehicle 1. The environment close to the vehicle is referred to as "crowded" when it comprises numerous vertical elements, such as vegetation, buildings, etc. For example, a crowded environment corresponds to an urban environment or to a rural environment comprising a forest or numerous features. Conversely, the environment is referred to as "clear".

The at least one environment sensor 22 can for example be configured to determine the radiofrequency propagation environment of the vehicle from the spectral analysis of the signals received by the at least one antenna 11. Thus, the at least one environment sensor 22 defines the quality of propagation of the radiofrequency signals in the environment close to the vehicle 1.

The at least one environment sensor 22 is also configured to send the at least one measured environment parameter to the control unit 12.

The speed sensor 23 of the vehicle 1 is configured to measure the speed of the vehicle 1 and to send the measured speed value to the control unit 12.

The at least one inclination sensor 24 installed in the vehicle 1 can be used to measure, in particular periodically, a so-called "roll" movement of the vehicle 1, defined as the rotational movement of the vehicle 1 about a longitudinal axis of said vehicle 1, called the "roll axis". The roll movement results in particular from the deformation of the road or from the effect of centrifugal force when the vehicle 1 is travelling on a curve. In addition, the at least one inclination sensor 24 is configured to send each measured value of the roll movement to the control unit 12.

The at least one inclination sensor 24 can also be used to measure, in particular periodically, a so-called "pitch" movement of the vehicle 1, defined as the rotational movement of the vehicle 1 about a transverse axis of said vehicle 1, called the "pitch axis". The pitch movement translates in particular a movement of the vehicle 1 when the latter is travelling on an undulating road. In addition, the at least one inclination sensor 24 is configured to send each measured value of the pitch movement to the control unit 12.

Based on another example, it is obvious that the vehicle 1 could comprise a first inclination sensor configured to measure the roll movement and a second inclination sensor configured to measure the pitch movement.

The at least one orientation sensor 25 of the vehicle 1 can be used to measure, in particular periodically, a so-called "yaw" movement of the vehicle 1, defined as the rotational movement of the vehicle about a vertical axis of said vehicle 1, called the "yaw axis". The yaw movement translates in particular the direction of movement of the vehicle 1. In addition, the at least one orientation sensor 25 is configured to send each measured value of the yaw movement to the control unit 12.

Still referring to FIG. 8, the control unit 12 comprises a memory area MEM. The memory area MEM stores the following information: a set of speed values for an LEO satellite, a set of orbital trajectories for an LEO satellite, a conversion table and a set of crowding levels.

Each speed value in the set of speed values is associated with an identifier.

Each orbital trajectory in the set of orbital trajectories is associated with an identifier.

The "conversion" table comprises a set of parameters representing the effects of the orientation and/or inclination of the vehicle 1 relative to the orbital trajectory of the satellite. In other words, the conversion table can be used to transform, by applying translations and rotations, in a manner known per se, the orbital trajectory of the satellite that is seen from the vehicle 1 on the basis of the orientation and inclination of said vehicle 1.

The set of crowding levels defines the crowding of the environment of the vehicle 1. In other words, the crowding level defines the radiofrequency propagation environment of the vehicle 1. For example, the set of levels comprises levels $n_i$, i being a natural number defined between 1 and N, N being a natural number greater than or equal to 2. For example, the higher the subscript i of the level $n_i$, the more crowded the environment relating to said level $n_i$. In another example, the lower the subscript i of the level $n_i$, the more crowded the environment relating to said level $n_i$.

The control unit 12 is configured to receive the geographical position of the vehicle 1 that is determined and sent by the at least one locator device 21 and/or the at least one parameter measured by the environment sensor 22.

In a first embodiment of the control unit 12, a predetermined calibration table of the at least one antenna 11 is stored in the memory area MEM of the control unit 12.

The calibration table comprises a plurality of columns and a plurality of rows. Each row is identifiable by a longitudinal coordinate $X_i$. Each column is identifiable by a transverse coordinate $Y_i$. The intersection of each row and each column is a cell in the calibration table, denoting an angular window, each angular window being characterized by a width and length that are specific to it. The length denotes the dimension of the cross section of an angular window along the longitudinal axis of the vehicle 1. The width denotes the dimension of the cross section of an angular window along the transverse axis of the vehicle 1.

The calibration table therefore represents a map of the sky that is seen from the vehicle 1, and in particular the two-dimensional plan of the set of angular windows that is shown in FIG. 4.

Furthermore, the sum of the lengths associated with each cell located in the same row, in other words having the same longitudinal coordinate $X_i$, is equal to the total length visible to the at least one antenna 11. The sum of the widths associated with each cell located in the same column, in other words having the same transverse coordinate $Y_i$, is equal to the total width visible to the at least one antenna 11.

In addition, each angular window is associated with a set of configuration instructions. Each set of instructions can be predetermined and stored in the memory area MEM or determined by the control unit 12.

In a second embodiment of the control unit 12, the control unit 12 is configured to determine the radiofrequency propagation environment of the vehicle 1, defining the quality of propagation of the radiofrequency signals in the environment close to the vehicle 1, in order to identify whether the vehicle 1 is located in a crowded area.

For this, the control unit 12 is configured to receive the geographical position sent by the locator device 21 and/or the at least one environment parameter sent by the environment sensor 22.

The control unit 12 is configured to determine, from the geographical position received or from the at least one environment parameter received, the crowding level $n_i$ of the environment of the vehicle 1, by selecting, from among the set of environment levels that is stored in the memory area MEM, the crowding level $n_i$ that fits the environment of the vehicle 1.

More precisely, from the geographical position, the control unit 12 is configured to determine whether or not the vehicle 1 is located in an urban area. From the at least one environment parameter, the control unit 12 is configured to determine whether or not obstacles, for example vegetation, features or buildings, are present in the environment of the vehicle 1. An urban area and the presence of obstacles corresponds to a crowded environment.

In said second embodiment of the control unit 12, the control unit 12 is also configured to determine the calibration table of the at least one antenna 11 from the crowding level $n_i$ determined.

The number of angular windows and the dimension of each angular window are defined on the basis of the environment of the vehicle 1, and more precisely on the basis of the crowding level $n_i$ determined.

The more the propagation environment is crowded, the more the number of angular windows decreases and the more the dimension of each angular window increases.

In addition, the control unit 12 is configured to determine a set of configuration instructions for each angular window of the determined calibration table and to associate said determined set of configuration instructions with the corresponding angular window.

The calibration table thus determined by the control unit 12 is stored in the memory area MEM of the control unit 12. Similarly, each set of configuration instructions that is determined, and associated with an angular window, is stored in the memory area MEM of the control unit 12.

The control unit 12 is configured to obtain a set of parameters including the position of the satellite that is visible to the vehicle 1 and associated with an identifier of said satellite, the speed of said satellite, the geographical position and speed of the vehicle 1 and the orientation and/or inclination of the vehicle 1.

More specifically, when the satellite is located in an angular window, and therefore the satellite is located in an area that is visible to said vehicle 1, the control unit 12 obtains the position of the satellite by receiving the position of the satellite. The position of the satellite may have been sent beforehand by the satellite itself, or by another satellite, or by other structures, such as by a fixed ground station, which knows, at all times, the position of each satellite.

The control unit 12 is configured to obtain the speed of the satellite by receiving the value of the speed of the satellite, which is sent by the satellite itself or by a fixed ground station, or by selecting the value of the speed, from among the set of speed values that is stored in the memory area MEM, that corresponds to the identifier associated with the received position of the satellite.

The control unit 12 obtains the geographical position of the vehicle by receiving the geographical position that is determined and sent by the at least one locator device 21. The control unit 12 obtains the speed of the vehicle 1 by receiving the value of the speed that is measured and sent by the speed sensor 23 of the vehicle 1.

The control unit 12 obtains the inclination of the vehicle 1 from each measured value of the pitch movement and each measured value of the roll movement that are received. As a reminder, each measured value of the roll movement and each measured value of the pitch movement is sent, in particular periodically, by the at least one inclination sensor 24 of the vehicle 1.

The control unit 12 obtains the orientation of the vehicle 1 from each received measured value of the yaw movement. As a reminder, each measured value of the yaw movement is sent, in particular periodically, by the at least one orientation sensor 25 of the vehicle 1.

The control unit 12 is configured to obtain the orbital trajectory of the satellite from the identifier associated with the received position of the satellite, which is sent by the satellite or a fixed ground station, and from the set of orbital trajectories stored in the memory area MEM. According to this embodiment, the control unit 12 selects from the memory area MEM the trajectory corresponding to the identifier received.

As another example, the control unit 12 is configured to identify the orbital trajectory of the satellite by directly receiving the orbital trajectory of said satellite, which is sent by the ground station or the satellite itself.

The control unit 12 is configured to associate a time interval with each angular window in the calibration table, stored in the memory area MEM, on the basis of the length of said angular window.

More precisely, for each angular window, the control unit 12 determines a duration by multiplying the speed of the satellite that is obtained by the length of said angular window. The duration obtained corresponds to the time interval.

Based on another example, the control unit 12 is configured to associate a time interval with each angular window in the calibration table, stored in the memory area MEM, on the basis of the width of said angular window by multiplying, for each angular window, the speed of the satellite that is obtained by the width of said angular window.

The control unit 12 is configured to determine the initial position of the satellite relative to the vehicle 1 from the received position of the satellite, the position of the vehicle 1, the speed of the vehicle 1 and the orientation and inclination of said vehicle 1 that are obtained. More precisely, the control unit 12 is configured to define the initial position of the satellite on the basis of the longitudinal coordinates $X_i$ and the transverse coordinates $Y_i$ in the calibration table stored in the memory area MEM.

The control unit 12 is also configured to associate the initial position of the satellite with an initial instant.

Figure 9:
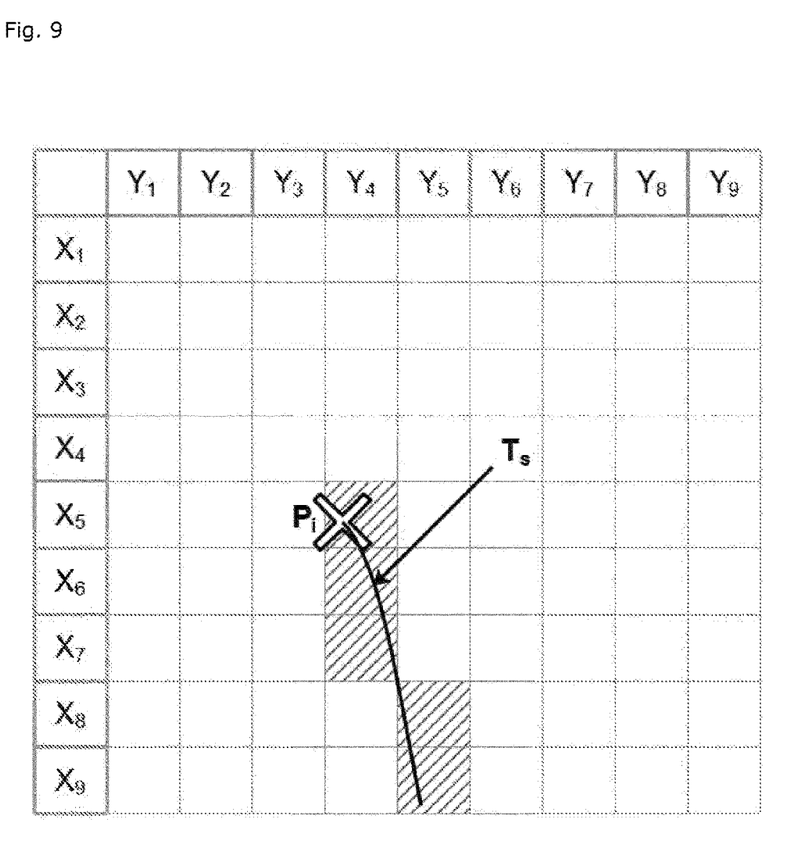
FIG. 9 shows the satellite's trajectory portion that is visible to the vehicle, determined on the basis of the longitudinal coordinates and the transverse coordinates shown in FIGS. 2 and 3.

By way of example, referring to FIG. 9, the initial position $P_i$ of the satellite that is determined, according to the longitudinal coordinates $X_i$ and the transverse coordinates $Y_i$ from the plan of all the angular windows shown in FIG. 4, is shown.

The control unit 12 is also configured to determine the portion of the trajectory of the satellite that is seen by the vehicle 1 from the determined initial position of the satellite, the orbital trajectory of the satellite that is obtained and the orientation and inclination of said vehicle 1 that are obtained. More precisely, the control unit 12 is configured to define the portion of the trajectory of the satellite that is seen by the vehicle on the basis of the longitudinal coordinates $X_i$ and the transverse coordinates $Y_i$ in the calibration table stored in the memory area MEM.

Referring to FIG. 9, the portion $T_s$ of the trajectory of the satellite that is determined, on the basis of the longitudinal coordinates $X_i$ and the transverse coordinates $Y_i$ from the plan of all the angular windows shown in FIG. 4, is shown.

Furthermore, if the vehicle 1 makes a turn or if the vehicle 1 is travelling on a winding or undulating road, the orientation and inclination of the vehicle 1 vary, which also modifies the portion of the trajectory of the satellite that is visible to the vehicle 1. This is why the control unit 12 is also configured to update the determined portion of the trajectory of the satellite that is seen by the vehicle 1.

Thus, since the control unit 12 periodically receives a measured value of the yaw movement, a measured value of the roll movement and a measured value of the pitch movement, the control unit 12 regularly obtains the orientation and the inclination of the vehicle 1. More precisely, when the control unit 12 obtains the orientation and the inclination, the control unit 12 is configured to transform the determined portion of the orbital trajectory of the satellite that is seen from the vehicle on the basis of the orientation and the inclination of said vehicle 1 that are obtained by using the conversion table stored in the memory area MEM.

The conversion table allows the control unit 12 to know what type of translations and/or rotations to apply to the determined portion of the orbital trajectory that is to be transformed.

According to another embodiment, the control unit 12 is configured to itself determine what type of translation and/or rotations to apply to the determined portion of the orbital trajectory, in order to update said determined orbital trajectory portion.

The control unit 12 is also configured to determine, from the calibration table stored in the memory area MEM, at least one angular window corresponding to the position of the satellite on the determined portion of the orbital trajectory of the satellite in a given time interval.

In other words, the control unit 12 is configured to determine the at least one angular window from the calibration table comprising at least one position of the determined portion of the orbital trajectory of the satellite.

By way of example, referring to FIG. 9, the determined angular windows comprising at least one position of the determined portion of the trajectory of the satellite are hatched and correspond to the following coordinates: $(X_8; Y_5)$, $(X_9; Y_5)$, $(X_5; Y_4)$, $(X_6; Y_4)$ and $(X_7; Y_4)$.

In addition, the control unit 12 is configured to organize the set of determined angular windows on the basis of the order in which the satellite passes through each angular window of the set of determined angular windows. For example, based on the example shown in FIG. 9, the control unit 12 is configured to organize the angular windows in the following order: $(X_5; Y_4)$, $(X_6; Y_4)$, $(X_7; Y_4)$, $(X_8; Y_5)$ and $(X_9; Y_5)$.

Thus, the first angular window corresponds to the angular window corresponding to the initial position $P_i$ of the satellite, in other words to the angular window of coordinates $(X_5; Y_4)$. The second angular window corresponds to the angular window through which the satellite passes after leaving the first angular window, and therefore, here, to the angular window of coordinates $(X_6; Y_4)$, etc.

The control unit 12 is also configured to adapt the radiation of the at least one antenna 11 so that said antenna radiates in the direction of the at least one determined angular window during the corresponding given time interval.

In other words, the control unit 12 is configured to control the at least one antenna 11, by transmitting, in other words by sending, at least one set of configuration instructions to the at least one antenna 11.

At a given instant, the set of configuration instructions to be sent corresponds to the set of configuration instructions that is associated with the angular window corresponding to the position of the satellite, on the determined orbital trajectory portion, at said given instant. The set of configuration instructions is sent over the time interval associated with the longitudinal coordinate $X_i$, or with the transverse coordinate of said angular window.

By way of example, at the initial instant, associated with the determined initial position $P_i$, the control unit 12 is configured to send the set of configuration instructions that is associated with the first angular window to the at least one antenna 11. In addition, the control unit 12 is configured to send said set of configuration instructions over the time interval associated with the longitudinal coordinate $X_i$, or with the transverse coordinate $Y_i$, of the first angular window.

Similarly, the control unit 12 is configured to send said set of configuration instructions for the second window to the at least one antenna 11 over the time interval associated with the longitudinal coordinate $X_i$, or with the transverse coordinate $Y_i$, of said second angular window, etc.

The control unit 12 comprises a processor capable of implementing a set of instructions for performing these functions.

The control unit 12 is also configured to determine the instant at which the LEO satellite is no longer visible. In addition, the control unit 12 is configured to determine that a second satellite is visible, by obtaining the position of said second satellite. Thus, when the first satellite is no longer visible, the control unit 12 is therefore configured to reproduce all the actions described above for said second satellite.

In other words, when the satellite is no longer visible, the control unit 12 can therefore be used to guarantee a communication link between the communication module 10 and a second visible satellite and so on without interruption. The control unit 12 can therefore be used to have a continuous communication link between the communication module 10 of the vehicle 1 and a satellite.

Method

Figure 10:
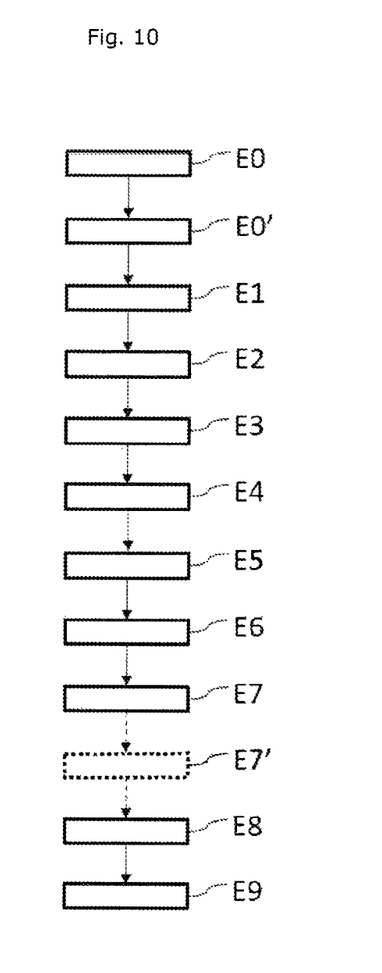
FIG. 10 shows one embodiment of the method according to the invention.

Referring to FIG. 10, there now follows a presentation of an embodiment of the method according to the invention, implemented by a communication module 10 as described above.

In a first embodiment of the method, the method is implemented by the first embodiment of the control unit 12, in which the calibration table is predetermined and stored in the memory area of the control unit 12 beforehand.

In a second embodiment of the method, the method comprises a step of determining E0 the radiofrequency propagation environment of the vehicle 1, defining the quality of propagation of the radiofrequency signals in the environment close to the vehicle, in order to identify whether the vehicle 1 is located in a crowded area.

During this step, the control unit 12 receives the geographical position of the vehicle 1 sent by the locator device 21 and at least one environment parameter sent by the at least one environment sensor 22.

The geographical position allows the control unit 12 to determine whether the vehicle 1 is located in an urban area, and therefore in a crowded area. The at least one environment parameter allows the control unit 12 to determine whether obstacles are present in the environment close to the vehicle 1. If obstacles are determined as present, the environment close to the vehicle 1 is also defined as "crowded".

Thus, the control unit 12 determines the crowding level $n_i$ of the environment of the vehicle 1 by selecting, from among the set of environment levels that is stored in the memory area MEM, the crowding level $n_i$ that fits the environment of the vehicle 1.

Still in the second embodiment of the method, the method then comprises a step of determining a calibration table E0' from the crowding level $n_i$.

The number of angular windows and the dimension of each angular window are defined on the basis of the propagation environment of the vehicle 1.

In addition, the dimensions of each angular window are proportional to the crowding of the determined radiofrequency propagation environment of the vehicle 1.

For example, when the crowding level $n_i$ is low, in other words when the environment is clear, the calibration table comprises a large number of angular windows, having relatively small dimensions, that are distributed over the total length and the total width visible to the at least one antenna 11.

As another example, when the crowding level $n_i$ is high, the calibration table comprises a small number of angular windows, having relatively large dimensions, that are distributed over the total length and the total width visible to the at least one antenna 11. In particular, when the crowding level $n_i$ is very high, the calibration table can comprise a single angular window.

Moreover, during the step of determining the calibration table E0', the control unit 12 determines, for each angular window in the calibration table, a set of configuration instructions for the at least one antenna 11. In addition, the control unit 12 associates each determined set of configuration instructions with the corresponding angular window.

Finally, the calibration table thus determined and the set of configuration instructions associated with each angular window are stored in the memory area MEM.

Fora given satellite, the method then comprises a step of transmitting E1 the position of said satellite, associated with the identifier of said satellite, by way of the satellite itself. Indeed, when a LEO satellite moves in its orbit, said satellite regularly transmits its position in its coverage area.

In another embodiment, the position of the satellite may have been sent beforehand by another satellite or by a ground station.

The method then comprises a step of receiving E2, by way of the at least one antenna 11 of each vehicle 1 present in the coverage area of the satellite, the position of the satellite that has been sent.

For a vehicle 1 whose at least one antenna 11 has received the position of the satellite, the method then comprises a step of transmitting E3 the received position of the satellite to the control unit 12 of said vehicle 1.

The method then comprises a step of obtaining E4, by way of the control unit 12, a set of parameters including the position of the LEO satellite, the speed of the LEO satellite and the position, the direction and/or the orientation and the speed of the vehicle 1.

More precisely, the control unit 12 receives the position of the satellite via the at least one antenna 11.

The control unit 12 obtains the speed of the satellite by receiving a value of the speed of the LEO satellite, sent by the satellite itself or by a ground station, or by selecting the value of the speed, from among the set of speed values that is stored in the memory area MEM, that corresponds to the identifier associated with the received position of the satellite.

The control unit 12 receives the geographical position of the vehicle 1 that is determined and sent by the locator device 21. The control unit 12 receives the value of the speed of the vehicle 1 that is measured and sent by the speed sensor 23 of the vehicle 1.

The control unit 12 obtains the inclination of the vehicle 1 from each measured value of the pitch movement and each measured value of the roll movement that are received. The control unit 12 obtains the orientation of the vehicle 1 from each measured value of the yaw movement that is received.

After the set of parameters has been obtained, the method comprises a step of obtaining the orbital trajectory of the satellite, during which the control unit 12 identifies the orbital trajectory of the satellite from the identifier associated with the received position of the satellite. More precisely, the control unit 12 is configured to select the orbital trajectory, stored in the memory area MEM, that is associated with said identifier.

In another embodiment of the step of obtaining the orbital trajectory, the control unit 12 receives the orbital trajectory of the satellite, which is sent directly by a ground station.

The method then comprises a step of associating E5 a time interval with each angular window.

According to a first embodiment, for each angular window, the control unit 12 determines a duration by multiplying the speed of the satellite that is obtained, which is stored in the memory area MEM, by the length of said angular window. The duration obtained corresponds to the time interval.

The speed of the satellite may also have been sent by a ground station.

After the set of parameters has been obtained, or after the association step E5, the method also comprises a step of determining E6 the initial position of the satellite relative to the vehicle 1 from the received position of the satellite and from the position, the speed, the orientation and/or the inclination of the vehicle 1 that are received. During this step, the initial position of the satellite is defined on the basis of the longitudinal coordinates $X_i$ and the transverse coordinates $Y_i$ in the calibration table that has previously been stored in the memory area MEM.

During said determination step E6, the initial position is associated with an initial instant.

The method then comprises a step of determining E7 the portion of the trajectory of the satellite that is seen by the vehicle 1 from the determined initial position $P_i$ of the satellite, and from the trajectory of the satellite that is stored in the memory area MEM. During this step, the portion of the trajectory of the satellite that is seen by the vehicle is therefore defined on the basis of the longitudinal coordinates $X_i$ and the transverse coordinates $Y_i$ in the calibration table stored in the memory area MEM.

Furthermore, following this, the method also comprises at least one step of updating E7' the determined portion of the trajectory of the satellite. Indeed, the control unit 12 periodically receives a measured value of the yaw movement, a measured value of the roll movement and a measured value of the pitch movement. Thus, the control unit 12 periodically obtains the inclination and orientation of the vehicle 1. This allows the control unit 12 to transform the determined portion of the trajectory of the satellite on the basis of the orientation and the inclination of the vehicle 1 that are obtained and the conversion table.

The method then comprises a step of determining E8, from the calibration table stored in the memory area MEM, at least one angular window corresponding to the position of the satellite on the determined portion of the trajectory of the satellite in a given time interval. Moreover, once the set of angular windows comprising at least one position of the trajectory of the satellite that is seen by the vehicle has been determined, the control unit 12 organizes the set of angular windows on the basis of the order in which the satellite passes through each angular window of the determined set of angular windows.

Moreover, if the portion of the trajectory of the determined satellite has been updated, the method comprises another step of determining at least one angular window corresponding to the position of the satellite on the portion of the trajectory of the satellite.

Once the at least one angular window has been determined, the method comprises a step of adapting E9 the radiation of the at least one antenna 11. In particular here, the control unit 12 sends the set of configuration instructions that is associated with the first angular window passed through by the satellite to the at least one antenna 11 over the time interval associated with the longitudinal coordinate $X_i$, or with the transverse coordinate of the first angular window. Thus, the at least one antenna 11 radiates in the first angular window.

The control unit 12 then does the same with each organized angular window. When the time interval associated with the first angular window has finished, the control unit 12 adapts the radiation of the at least one antenna 11 by transmitting the set of configuration instructions that is associated with the second angular window passed through by the position of the satellite over the time interval associated with the longitudinal coordinate $X_i$, or with the transverse coordinate $Y_i$, of the second angular window. In this way, the at least one antenna 11 radiates in the second angular window.

When the control unit 12 has sent the sets of configuration instructions for each determined window, this means that the satellite is then no longer visible.

Thus, when the satellite is no longer visible, the method is repeated, in particular after the at least one antenna 11 has received the position of a second satellite moving in one of the areas of the sky that is visible to the vehicle 1. The method can therefore be used to guarantee a communication link between the communication module 10 and a second visible satellite and so on, without interruption.

Thus, the method and the control unit 12 of the communication module 10 allow the at least one antenna 11 to radiate in the angular window in which the satellite is located, thus making it possible to ensure a reliable communication channel between the communication module 10 and the satellite. Then, without interruption, the method and the control unit 12 can be used to ensure a communication channel between the communication module 10 and a second satellite, etc.

The invention claimed is:

1. A satellite communication module for a vehicle, said communication module comprising an electronic control unit and at least one antenna capable of communicating with a plurality of satellites that are characterized by a predefined orbital trajectory and the same predefined speed:
   a) the at least one antenna being configurable according to a plurality of configurations, each configuration allowing the at least one antenna to radiate in an angular window among a plurality of predefined angular windows, each angular window corresponding to an area of the sky that is characterized by a longitudinal coordinate and a transverse coordinate, b) the control unit comprising a memory area, said memory area comprising a calibration table of the at least one antenna, representing a map of the sky seen from the vehicle and comprising a plurality of columns and a plurality of rows, each row being identifiable by a longitudinal coordinate, each column being identifiable by a transverse coordinate, the intersection of each row and each column being a cell in the calibration table, denoting an angular window, the control circuit being configured to:

i) obtain a set of parameters comprising the position, the orbital trajectory and the speed of a satellite and the position, the inclination and/or the orientation, and the speed of the vehicle, ii) determine the portion of the trajectory of the satellite that is seen from the vehicle from the set of parameters that is obtained, iii) determine, from the calibration table, at least one angular window corresponding to the position of the satellite on the determined portion of the trajectory in a given time interval, iv) adapt the radiation of the at least one antenna so that said antenna radiates in the direction of the at least one determined angular window during the corresponding given time interval.

2. The communication module as claimed in claim 1, wherein the control unit is configured to:

i) determine the radiofrequency propagation environment of the vehicle, defining the quality of propagation of the radiofrequency signals in the environment close to the vehicle, in order to identify whether the vehicle is located in a crowded area, ii) determine the calibration table of the at least one antenna, the number of angular windows and the dimension of each angular window being defined on the basis of the propagation environment of the vehicle, the more the environment of the vehicle is crowded, the more the number of angular windows decreases, and the more the dimension of each angular window increases.

3. The communication module as claimed in claim 1, wherein the control unit is configured to determine the initial position of the satellite, on the basis of the longitudinal coordinates and the transverse coordinates in the calibration table, from the position of the satellite that is obtained and from the position, speed, orientation and/or inclination of the vehicle that are obtained, in order to determine the portion of the trajectory of the satellite that is seen by the vehicle.

4. The communication module as claimed in claim 1, wherein each angular window in the calibration table is associated with a set of configuration instructions, and the set of configuration instructions for a given angular window that is applied to the at least one antenna allows the at least one antenna to radiate in said given angular window, the control unit being configured to adapt the at least one antenna so that said antenna radiates in the direction of a determined angular window by transmitting the set of configuration instructions that is associated with said determined angular window to the at least one antenna.

5. The communication module as claimed in claim 4, wherein, each longitudinal coordinate in the calibration table being associated with a predetermined time interval, the control unit is configured to adapt the position of the at least one antenna by sending the set of configuration instructions that is associated with the angular window in which the satellite is located at a given instant over the time interval associated with the longitudinal coordinate of said angular window.

6. The communication module as claimed in claim 1, wherein the control unit is configured to periodically receive the inclination and the orientation of the vehicle, and, for each inclination and/or orientation of the vehicle that is obtained, the control unit is configured to transform, by applying translations and rotations, the portion of the orbital trajectory of the satellite that is seen from the vehicle on the basis of the orientation and inclination of said vehicle that are obtained.

7. A vehicle comprising a satellite communication module as claimed in claim 1.

8. A satellite communication method for a vehicle, said vehicle comprising a communication module as claimed in claim 1, said method comprising:

i) obtaining a set of parameters comprising the position, the orbital trajectory and the speed of the satellite and the position, the inclination and/or the orientation and the speed of the vehicle, ii) determining the portion of the trajectory of the satellite that is seen from the vehicle from the set of parameters that is obtained, iii) determining, from the calibration table, the at least one angular window corresponding to the position of the satellite on the determined portion of the trajectory in a given time interval, iv) adapting the radiation of the at least one antenna so that said antenna radiates in the direction of the at least one determined angular window during the corresponding given time interval.

9. The method as claimed in claim 8, comprising, before the step of determining the at least one angular window corresponding to the position of the satellite, the steps of:

i) determining the radiofrequency propagation environment of the vehicle (1), defining the quality of propagation of the radiofrequency signals in the environment close to the vehicle, in order to identify whether the vehicle is located in a crowded area, ii) determining the calibration table of the at least one antenna, the number of angular windows and the dimension of each angular window being defined on the basis of the propagation environment of the vehicle, the more the environment of the vehicle is crowded, the more the number of angular windows decreases, and the more the dimension of each angular window increases.

10. A computer program product, loaded on to a non-transitory computer readable medium, comprising a set of program code instructions that, when they are executed by one or more processors, configure the one or more processors to implement a method as claimed in claim 8.

* * * * *